US006237063B1

(12) United States Patent
Bachmat et al.

(10) Patent No.: US 6,237,063 B1
(45) Date of Patent: *May 22, 2001

(54) LOAD BALANCING METHOD FOR EXCHANGING DATA IN DIFFERENT PHYSICAL DISK STORAGE DEVICES IN A DISK ARRAY STORAGE DEVICE INDEPENDENTLY OF DATA PROCESSING SYSTEM OPERATION

(75) Inventors: Eitan Bachmat, Hopkinton; Yuval Ofek, Framingham, both of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/143,684

(22) Filed: Aug. 28, 1998

Related U.S. Application Data

(63) Continuation-in-part of application No. 09/002,428, filed on Jan. 2, 1998, now Pat. No. 6,088,766, which is a continuation-in-part of application No. 08/944,606, filed on Oct. 6, 1997, now Pat. No. 6,061,761.

(51) Int. Cl.[7] .............................. G06F 12/00; G06F 13/00
(52) U.S. Cl. .......................... 711/114; 711/170; 711/167; 714/7
(58) Field of Search ........................... 711/111, 112, 114, 711/170, 167; 709/105; 714/6, 7; 360/901

(56) References Cited

U.S. PATENT DOCUMENTS

| 3,702,006 | | 10/1972 | Page ....................................... 709/105 |
| 4,633,387 | | 12/1986 | Hartung et al. ....................... 709/105 |
| 5,239,649 | | 8/1993 | McBride et al. ...................... 709/105 |
| 5,333,315 | * | 7/1994 | Seather et al. ............................. 707/1 |
| 5,544,327 | * | 8/1996 | Dan et al. .............................. 709/234 |
| 5,617,432 | | 4/1997 | Eggenberger et al. ............... 714/752 |
| 5,694,571 | * | 12/1997 | Fuller ................................... 711/113 |
| 5,754,882 | * | 5/1998 | Tobagi et al. ............................ 710/6 |
| 5,802,301 | * | 9/1998 | Dan et al. .............................. 709/223 |
| 5,852,705 | * | 12/1998 | Hanko et al. ........................... 386/92 |
| 5,926,649 | * | 7/1999 | Ma et al. .................................. 710/6 |
| 5,937,428 | * | 8/1999 | Jantz .................................... 711/114 |
| 5,961,613 | * | 10/1999 | DeNicola ............................... 710/18 |

FOREIGN PATENT DOCUMENTS

| 0726514 | 8/1996 | (EP) . |
| 2257273 | 1/1993 | (GB) . |

OTHER PUBLICATIONS

P. Scheuerman et al: "Data Partioning and load balancing in parallel disk systems" The VLDB Journal, Feb. 1998, pp. 48–66.

G. Weikum et al.: "Dynamic File Allocation in Disk Arrays" SIGMOD Record, vol. 20, No. 2, Jun. 1991 (191–06), pp. 406–415, XP000364655 New York, USA.

* cited by examiner

*Primary Examiner*—Do Hyun Yoo
*Assistant Examiner*—Hong Kim
(74) *Attorney, Agent, or Firm*—George A. Herbster; Pearson & Pearson

(57) ABSTRACT

Load balancing of activities on physical disk storage devices is accomplished by monitoring reading and writing operations to blocks of contiguous storage locations on the physical disk storage devices. A list of exchangeable pairs of blocks is developed based on size and function. Statistics accumulated over an interval are then used to obtain access activity values for each block and each physical disk drive. A statistical analysis leads to a selection of one block pair. After testing to determine any adverse effect of making that change, the exchange is made to more evenly distribute the loading on individual physical disk storage devices.

16 Claims, 7 Drawing Sheets

LOAD BALANCING METHOD FOR EXCHANGING DATA IN DIFFERENT PHYSICAL DISK STORAGE DEVICES IN A DISK ARRAY STORAGE DEVICE INDEPENDENTLY OF DATA PROCESSING SYSTEM OPERATION

CROSS REFERENCE TO RELATED APPLICATIONS

This is a continuation-in-part of application for U.S. patent Ser. No. 09/002,428 filed Jan. 2, 1998, now U.S. Pat. No. 6,088,766 issued Jul. 11, 2000, that is a continuation-in-part of application for U.S. patent Ser. No. 08/944,606 filed Oct. 6, 1997, now U.S. Pat. No. 6,061,761 that issued May 9, 2000 which are assigned to the same assignee as this invention.

BACKGROUND OF THE INVENTION

1. Field of the Invention

This invention generally relates to the management of resources in a data processing system and more particularly to the management of a disk array storage device.

2. Description of Related Art

Many data processing systems now incorporate disk array storage devices. Each of these devices comprises a plurality of physical disks arranged into logical volumes. Data on these devices is accessible through various control input/output programs in response to commands, particularly reading and writing commands from one or more host processors. A Symmetrix 5500 series integrated cached disk array that is commercially available from the assignee of this invention is one example of such a disk array storage device. This particular array comprises multiple physical disk storage devices or drives with the capability of storing large amounts of data up to one terabyte or more. The management of such resources becomes very important because the ineffective utilization of the capabilities of such an array can affect overall data processing system performance significantly.

Generally a system administrator will, upon initialization of a direct access storage device, determine certain characteristics of the data sets to be stored. These characteristics include the data set size, and volume names and, in some systems, the correspondence between a logical volume and a particular host processor in a multiple host processor system. Then the system administrator uses this information to configure the disk array storage device by distributing various data sets across different physical devices accordingly with an expectation of avoiding concurrent use of a physical device by multiple applications. Often times allocations based upon this limited information are or become inappropriate. When this occurs, the original configuration can degrade overall data processing system performance dramatically.

One approach to overcoming this problem has been to propose an analysis of the operation of the disk array storage device prior to loading a particular data set and then determining an appropriate location for that data set. For example, U.S. Pat. No. 4,633,387 to Hartung et al. discloses load balancing in a multi-unit data processing system in which a host operates with multiple disk storage units through plural storage directors. In accordance with this approach a least busy storage director requests work to be done from a busier storage director. The busier storage director, as a work sending unit, supplies work to the work requesting, or least busy, storage director.

U.S. Pat. No. 5,239,649 to McBride et al. discloses a system for balancing the load on channel paths during long running applications. In accordance with the load balancing scheme, a selection of volumes is first made from those having affinity to the calling host. The load across the respective connected channel paths is also calculated. The calculation is weighted to account for different magnitudes of load resulting from different applications and to prefer the selection of volumes connected to the fewest unused channel paths. An optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information. The method continues quickly during subsequent selection of the remaining volumes for processing.

In another approach, U.S. Pat. No. 3,702,006 to Page discloses load balancing in a data processing system capable of multi-tasking. A count is made of the number of times each I/O device is accessed by each task over a time interval between successive allocation routines. During each allocation, an analysis is made using the count and time interval to estimate the utilization of each device due to the current tasks. An estimate is also made with the anticipated utilization due to the task undergoing allocation. The estimated current and anticipated utilization are then considered and used as a basis for attempting to allocate the data sets to the least utilized I/O devices so as to achieve balanced I/O activity.

Each of the foregoing references discloses a system in which load balancing is achieved by selecting a specific location for an individual data set based upon express or inferred knowledge about the data set. An individual data set remains on a given physical disk unless manually reconfigured. None of these systems suggests the implementation of load balancing by the dynamic reallocation or configuration of existing data sets within the disk array storage system.

Another load balancing approach involves a division of reading operations among different physical disk drives that are redundant. Redundancy has become a major factor in the implementation of various storage systems that must also be considered in configuring a storage system. U.S. Pat. No. 5,819,310 issued Oct. 6, 1998 discloses such a redundant storage system with a disk array storage device that includes two device controllers and related disk drives for storing mirrored data. Each of the disk drives is divided into logical volumes. Each device controller can effect different reading processes and includes a correspondence table that establishes the reading process to be used in retrieving data from the corresponding disk drive. Each disk controller responds to a read command that identifies the logical volume by using the correspondence table to select the appropriate reading process and by transferring data from the appropriate physical storage volume containing the designated logical volume.

Consequently, when this mirroring system is implemented, reading operations involving a single logical volume do not necessarily occur from a single physical device. Rather read commands to different portions of a particular logical volume may be directed to any one of the mirrors for reading from preselected tracks in the logical volume. Allowing such operations can provide limited load balancing and can reduce seek times.

Other redundancy techniques and striping techniques can tend to spread the load over multiple physical drives by dividing a logical volume into sub-volumes that are stored on individual physical drives in blocks of contiguous storage locations. However, if the physical drives have multiple logical volumes, sub-volumes or other forms of blocks of contiguous storage locations, the net effect may not balance the load with respect to the totality of the physical disk drives. Thus, none of the foregoing references discloses or suggests a method for providing a dynamic reallocation of physical address space based upon actual usage.

SUMMARY

Therefore it is an object of this invention to provide a dynamic reallocation of a disk array storage device, thereby to reduce any imbalance of load requirements on each physical device with multiple blocks of contiguous storage locations in a disk array storage device.

Another object of this invention is to provide load balancing in a disk array storage device in which the physical devices can store blocks of contiguous storage locations of different sizes.

In accordance with this invention load balancing will occur at some arbitrary time interval, typically after an interval of one or more days. To that point in time various reading and writing statistics are accumulated to different blocks of contiguous storage locations. The compiled data is then used to select two blocks as candidates for an exchange and thereafter exchanging the data in the selected logical blocks.

In accordance with another aspect of this invention, load balancing activity occurs with respect to a plurality of physical disk storage devices in a data processing system wherein at least two of the physical disk storage devices are divided into a plurality of logical volumes for storing data on a plurality of physical disk storage devices. The data processing system additionally includes first and second buffer volumes on other physical disk storage devices capable of storing any of the logical volumes. Disk access statistics are complied for all the logical volumes over a time interval. These statistics are used to select first and second logical volumes on different physical disk storage devices to be exchanged based upon the compiled disk access statistics. Once the selection is made, the (a)data in the selected first and second logical volumes are exchanged by transfer through the first and second buffer volumes.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
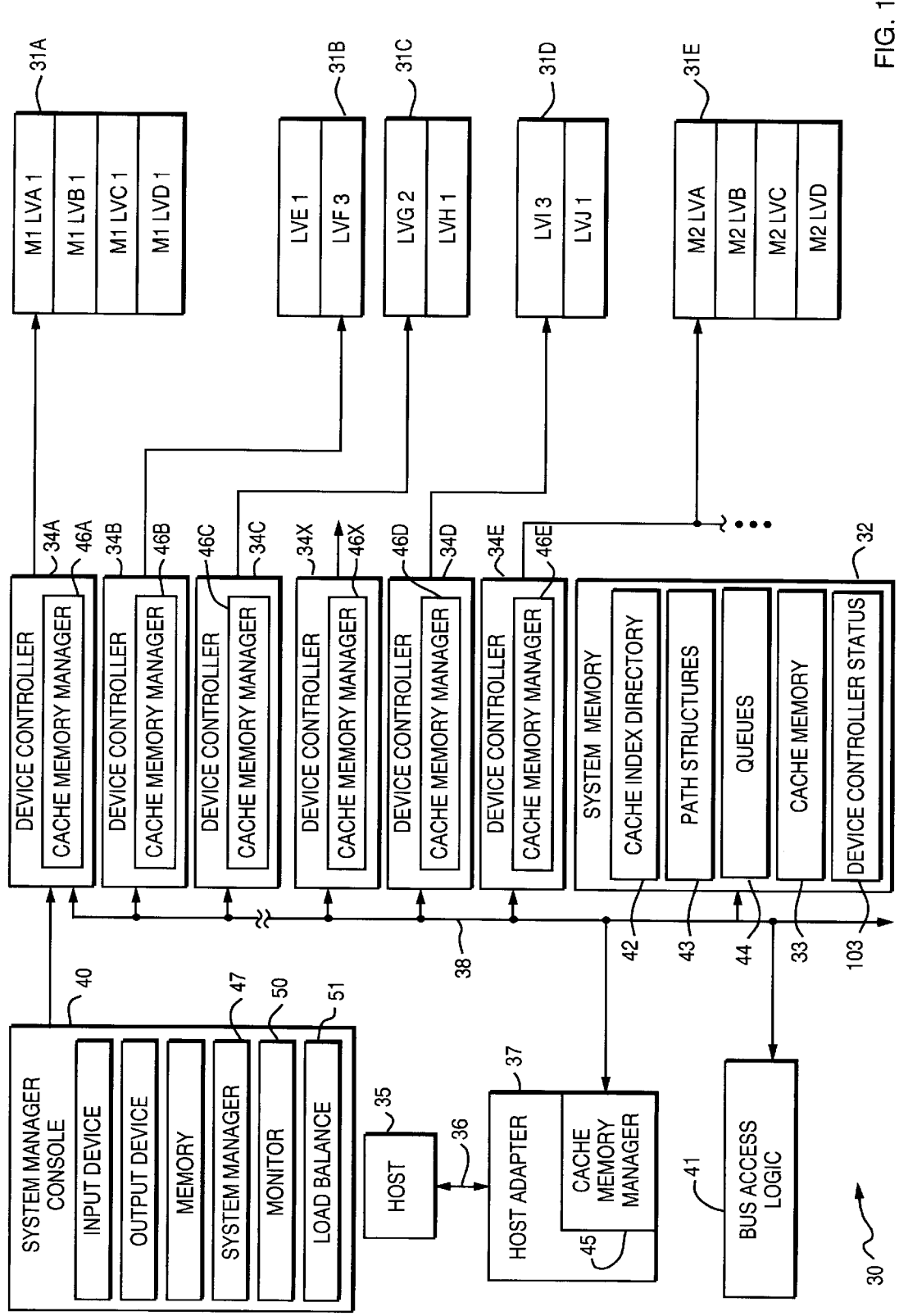
FIG. 1 is a block diagram of a specific data processing system that implements this invention.

FIG. 1 depicts, in block form, and as a typical data processing system 30, a Symmetrix 5500 series integrated cached disk array that includes such a data memory system with a number of data storage devices or physical disk storage devices 31A, 31B, 31C, 31D and 31E, by way of example, and a system memory 32 with a cache memory 33. In this particular embodiment the system 30 includes several device controllers 34A, 34B, 34C, 34D and 34E connected to corresponding ones of the physical disk storage devices 31A through 31E plus a device controller 34X representing other controllers and attached physical disk storage devices. Each device controller may have a known basic structure or a more sophisticated structure associated with mirrored operations as described in the above-identified U.S. Pat. No. 5,819,310.

The device controller 34A is shown with an associated physical disk storage device 31A divided into the mirrored logical volumes M1-LVA, M1-LVB, M1-LVC and M1-LVD; the device controller 34E controls the other physical disk storage device 31E that stores the mirrored logical volumes M2-LVA, M2-LVB, M2-LVC and M2-LVD. The logical volumes in physical disk storage devices 31A and 31E are assumed to have the same size for purposes of this explanation. However, mirrored and non-mirrored logical volumes in a physical disk storage device can have different sizes. For example, physical disk storage device 31B is depicted with two logical volumes LVE and LVF.

Assume that the LVE logical volume has the same size as the logical volumes in the physical disk 31A and that the logical volume LVF has a size that is three times the size of the logical volume LVE. Physical disk storage device 31C is shown with a logical volume LVG having twice the size of a logical volume LVH which, in turn, would have the same size as the logical volume LVA. Physical disk storage device 31D has a logical volume LVI which is three times the size of the logical volume LVJ which, in turn, has the same size as the logical volume LVA.

Moreover, there is no requirement that mirrored logical volumes in one physical disk storage device need to be mirrored on a single mirroring physical disk storage device. For example the locations of the LVJ and M2-LVA logical volumes could be interchanged. As will become apparent, in actual practice the absolute and relative sizes of logical volumes and the positions of the logical volumes will vary.

Still referring to FIG. 1 a single processor or host 35, an interconnecting data access channel 36 and a host adapter 37 connect to the system memory 32 over a system bus 38. A typical data processing system 30 may comprise multiple host adapters that connect to the system bus 38 in parallel. One or more hosts may also connect to each host adapter.

A system manager console 40 includes an additional processor that connects to the system bus 38 typically through one or more of the device controllers, such as device controller 34A by means of a serial or other communications link to the device controller 34A. The system manager console 40 permits a system operator to run set-up and diagnostic programs for configuring, controlling and monitoring the performance of the data processing system 30. Essentially the system manager console 40 enables the operator to establish communications with the host adapter 37, the device controller 34B and the system memory 32.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 in FIG. 1 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables for logical devices, cylinders, and tracks. The system memory 32 also includes areas for data structures 43 and queues 44. The basic operation of the system memory 32 is described in Yanai et al., U.S. Pat. No. 5,206,939 issued Apr. 27, 1993. System memory 32, particularly the cache memory 33, may also include a region of memory known as permacache memory. As is well known, data elements remain in permacache memory unless they are specifically deleted.

The coordination of each of the host adapters with each of the device controllers is simplified by using the system memory 32, and in particular the cache memory 33, as a buffer for data transfers between each host adapter and each device controller. Such a system, for example, is described in U.S. Pat. No. 5,206,939. In such a system, it is not necessary to provide a processor dedicated to managing the cache memory 33. Instead, each of the host adapters or device controllers executes a respective cache manager program, such as one of the cache manager programs 45 in the host adapter 37 and cache manager programs 46A and 46B in each of the device controllers 34A through 34X. A system manager program 47 performs a similar function for the system manager console 40 and enables the operator to configure the system. Each of the cache manager programs accesses the cache index directory 42 and operates with data structures and queues for storing various commands. More specifically, the cache memory manager program 45 in the host adapter 37 writes data from the host 35 into the cache memory 33 and updates the cache index directory 42.

In addition each cache memory manager gathers statistics. The cache memory manager 45 will accumulate statistics concerning a number of parameters. For the purpose of this invention, the number of reading and writing operations requested by a host 35 or connected hosts are important. Likewise each of the cache memory managers 46A through 46X in each of the device controllers 34A through 34X gathers statistics for the logical volumes on each connected physical disk storage device. A monitor 50 in the system manager console 40 integrates these cache memory managers to obtain appropriate statistics at given intervals.

From the foregoing, disk operations included in any measure of the loading of a logical volume will include reading operations and writing operations. Reading operations can be further classified as read-hit, read-miss and sequential read operations. A read-hit operation occurs when the data to be read resides in the cache memory 33. A read-miss occurs when the data to be read is not available in the cache memory 33 and must be transferred from a physical disk storage device. Sequential read operations are those that occur from sequentially addressed storage locations.

The system operates with two types of writing operations. The first transfers the data from the host 35 to the cache memory 33. The second type transfers the data from the cache memory 33 to a physical disk storage device. The second type operates in a background mode, so it is possible that the host 35 may write data to a location more than once before the data is written to a physical disk storage device. Consequently the number of writing operations of the second type normally will not correspond to and will be less than the number of writing operations of the first type.

With this background, one program for determining appropriate reallocations of logical volumes on physical disks in accordance with this invention can be described. The program relies upon information supplied from the performance monitor 50 that retrieves statistics from each cache memory manager on a periodic basis. The periodicity will be selected according to conventional sampling criteria. Typical periods will be from up to 15 to 30 or more minutes. As each set of statistics is time stamped and accumulated by logical volume, the total number of read operations, a read-hit ratio, a sequential-read ratio and the total number of writing operations over a test interval can be obtained. The load balance program 51 shown in FIG. 1 then operates according to FIGS. 2A and 2B to generate, from that collected monitored performance generally represented by step 60 in FIG. 2A, a reallocation or exchange of a pair of logical volumes. Specifically when it is time to perform an analysis, a wait loop represented as a decision step 61 transfers control to retrieve, by means of the performance monitor 50 in step 62, all the statistics that are relevant to the test interval.

The load balance program 51 uses step 63 to define a list of pairs of exchangeable logical volumes. There are several criteria that must be evaluated in determining this list. First, exchangeable logical volumes must have the same size. In actual practice most logical volumes will be selected from one of a relatively small number of physical sizes. Second, any interrelationship between the two logical volumes to be exchanged must be examined to determine whether there is any reason to preclude the exchange. For example, swapping logical volumes on the same physical disk storage device generally will have little or no impact. Mirroring, as described in the above-identified U.S. Pat. No. 5,819,310 or other redundancy may further restrict the available exchangeable pairs of logical volumes. For example, mirrored logical volumes normally will be precluded from residing on the same physical disk storage device or even on physical disk storage devices on the same controller or adjacent controllers. For RAID-5 redundancy, exchangeable pairs of logical volumes usually will be limited to those in the same parity group.

In the specific example of FIG. 1, based on size, the logical volumes LVA through LVE, LVH and LVJ are all potential exchange candidates. Likewise the logical volumes LVF and LVI are candidates for exchange. There is no logical volume as a candidate for exchanging with the LVG logical volume in the specific embodiment shown in FIG. 1.

Using the functional criteria, the potential logical volumes that could be swapped with the logical volume M1-LVA in the physical drive 31A include logical volumes LVE, LVH and LVJ, assuming that an exchange with a mirror would have no effect. Swapping the LVA logical volume in physical disk 31A with any of the logical volumes LVB through LVD in physical drive 31E is precluded because both mirrors of the logical volume LVA would be resident on the same physical disk drive. Other potential logical volume pairs include the pairs LVE-LVH, LVH-LVJ and LVE-LVJ. The logical volumes LVF and LVI define one exchangeable pair. Thus in this particular embodiment there are twenty-seven possible exchangeable pairs of logical volumes.

In step 64, the load balance program uses the accumulated statistics and read-hit ratio to produce a read-miss value, a sequential-read value and a write-to-disk value for each logical volume over the prior test interval. As previously indicated the read-miss value corresponds to the number of read operations that require access to a physical disk drive for data, a read-hit being a reading operation that finds the requested data in the cache memory 33 of FIG. 1. When step 64 is completed, there exists, for each logical volume, a logical volume access activity value, x, represented by the sum of the read-miss and write-to-disk operations.

The logical volume access activity value can be further refined to reflect the actual load imposed by different operations. For example, each write operation can be considered as imposing half the load of a read-miss operation. If such an assumption is carried forward, the logical volume access activity is equal to the total number of read-miss operations plus half the total number of write operations. If a series of sequential-read operations occur, the number of events in the sequence can be divided by 4 or some other number to compensate for the difference in loading imposed by sequential and random reading operations. In a mirrored configuration, a read-miss results in only one read operation being performed although there is a potential for two, one from each mirror. Consequently, in a mirrored system the number of read misses to a mirrored logical volume will be halved to compensate for mirroring.

In step 65 the load balancing program 51 constructs for a subinterval a table that identifies the total access activity value for each physical storage device by summing, for each physical disk storage device, the access activity values for each logical volume on that physical disk storage device. At this point step 66 determines a total average physical activity value by summing the subinterval physical volume access activity values and dividing by the number of physical devices.

Figure 2A:
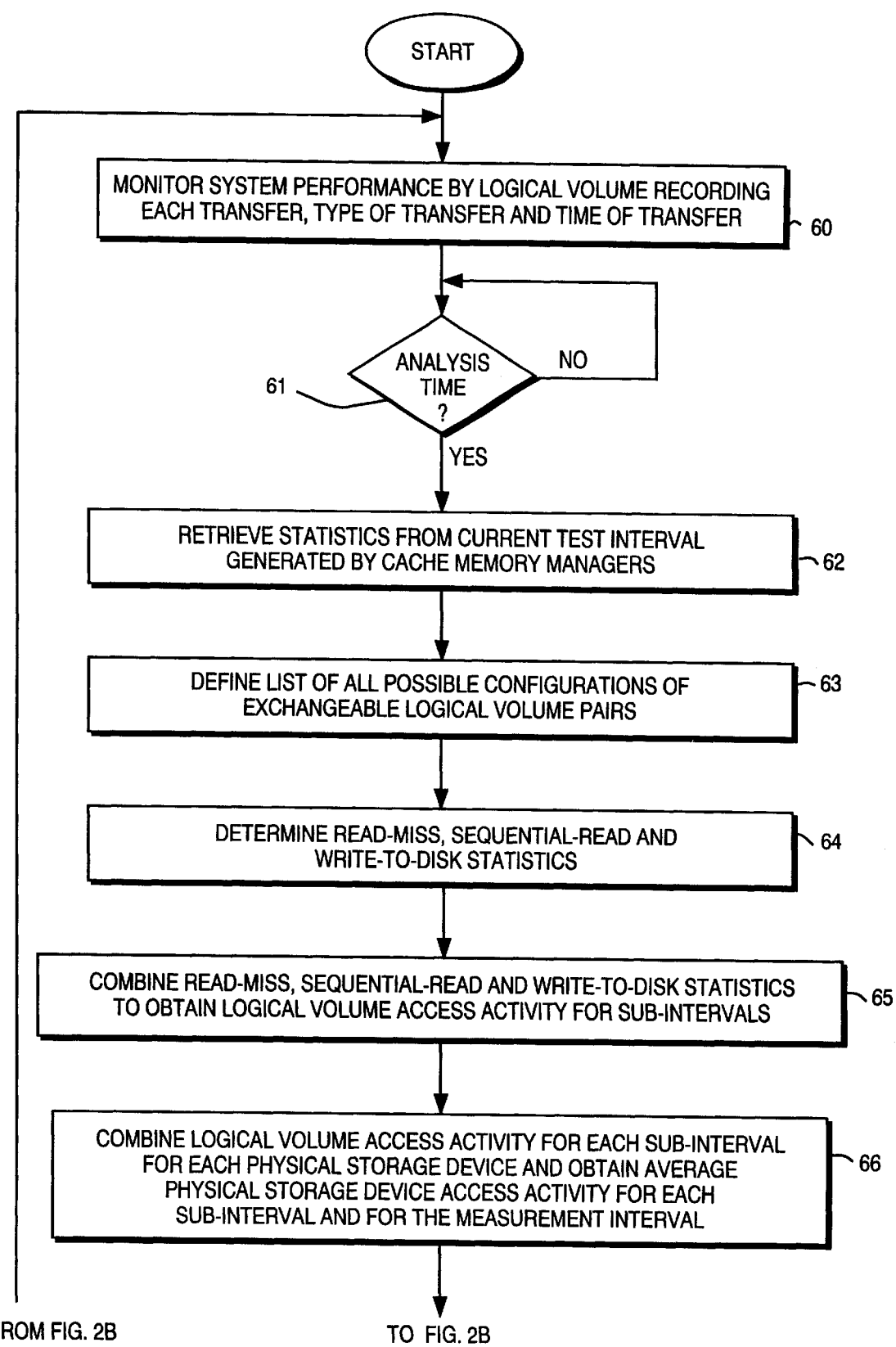
FIGS. 2A and 2B constitute a flow diagram that depicts one procedure for exchanging logical volumes in accordance with this invention.
Figure 2B:
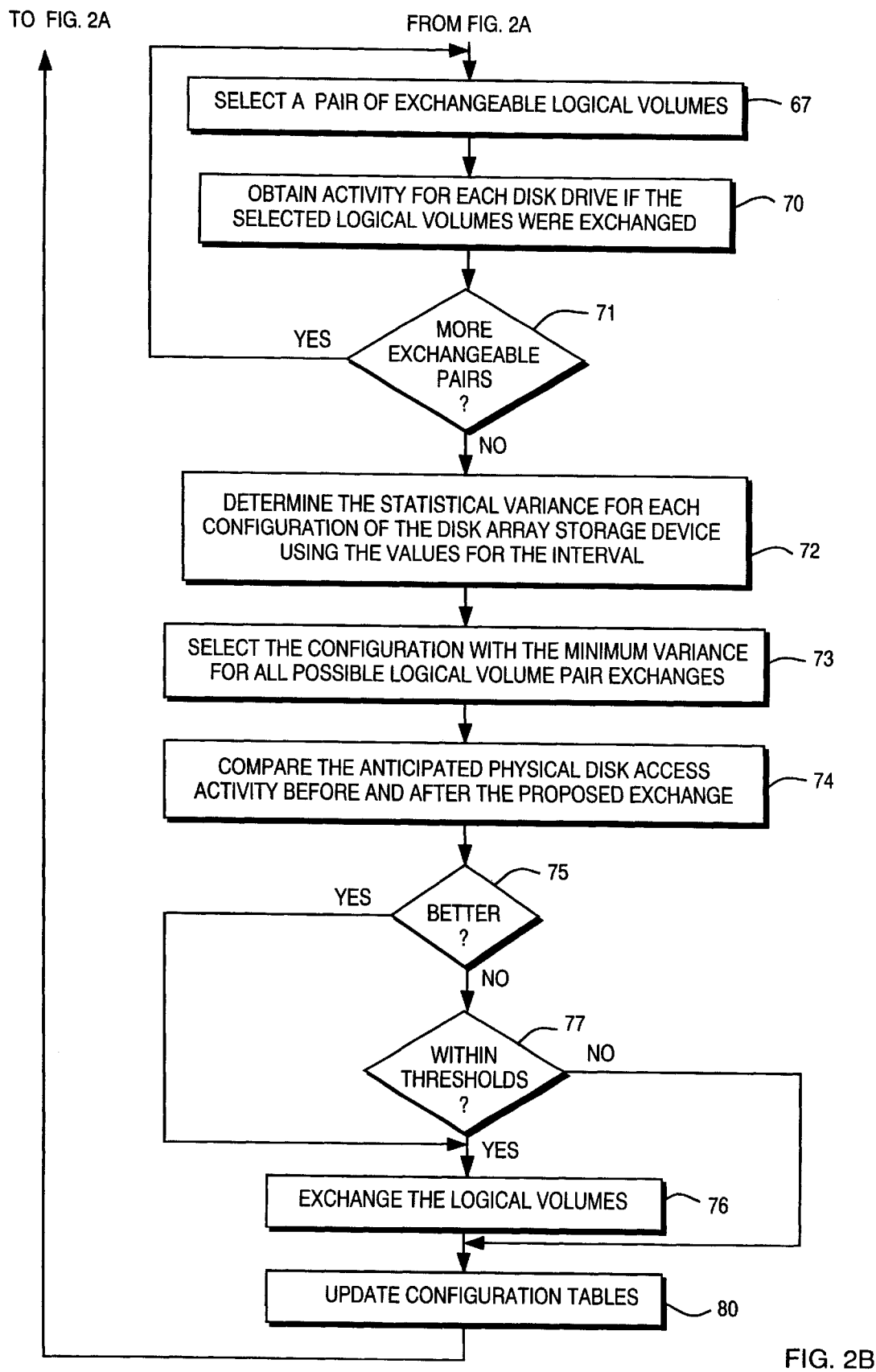

When step 66 in FIG. 2A has been completed, control passes to steps 67 and 70 that form a loop under a loop control 71 in FIG. 2B. Specifically step 67 selects a pair of logical volumes from the list developed in step 63 of FIG. 2A. Assume, for example, that the pair M1 LVA-LVE is selected. In step 70 the load balancer program 51 utilizes the accumulated statistics for obtaining the activity for each physical disk drive as if those two logical volumes had been exchanged. This loop continues until all the logical volume pairs in the list have been evaluated. Once this occurs, control branches to step 72 to define a statistical variance for each configuration according to $$|E(x^2)-[E(x)]^2|_{min} \qquad (1)$$

That is, for each possible configuration the load balance program 51 step 72 determines the average access activity value for the physical disk storage devices with the logical volume pairs and obtains a difference from the average physical drive access activity value obtained in step 65 assuming each pair is exchanged. Thereafter step 72 produces the statistical variance for each logical volume pair exchange. In step 73 the load balancer program 51 selects a logical volume pair that produces the minimum statistical variance. Processes for obtaining the above-identified statistical variances are well known in the art.

After that selection, the identity of the logical-volume pair is used in a pretest of the selection. As previously indicated, the monitor 50 accumulates data as discrete sets on a periodic and recorded time basis. In step 74 the load balancing program breaks the total test interval into subintervals that may include one or more sampling periods. Next the activity values for each subinterval or group of subintervals are determined. If the access activity value for exchange effected physical drives is less than the original, step 75 branches to step 76 to initiate the exchange. If a subinterval exists that exceeds the average, step 77 determines whether the access activity value is within an acceptable limit. If it is, the exchange occurs in step 77 and the configuration tables in the system are updated to reflect the new configuration. Otherwise no exchange is made.

When step 76 exchanges the designated logical volumes, such an exchange, or swap, can occur by selecting an unused area in one of the physical disk drives to operate as a buffer. This may be an unused area in a physical disk storage device or in a dynamic spare physical disk storage device. The general use of physical disk storage devices as dynamic spares is known in the art. In other circumstances it may be possible to utilize a cache memory such as the cache memory 33 in FIG. 1, as a buffer. If a single buffer is to be used and logical volumes LVE and LVJ are to be exchanged, a concurrent copy or other transfer sequence can move (1) the LVE logical volume to the buffer, (2) the logical volume LVJ to the corresponding area in the physical disk storage device 31B and (3) the logical volume buffer to the area in physical disk storage device 31D. The use of a concurrent copy or other analogous procedure enables the exchange to occur on-line, albeit with some performance degradation for the duration of the transfer. After the exchange is completed, control branches back to step 60 in FIG. 2A to initiate the monitor 50 thereby to accumulate additional statistics about the new configuration.

In accordance with this specific example, assume that both the logical volumes LVE and LVF in physical disk storage device 31B have become very active and that the logical volume LVJ on physical disk storage device 31D is relatively inactive. If all other logical volumes were equally active, the statistical variance should be minimal when the logical volume pair LVE and LVJ is selected. Therefore those two volumes would be exchanged thereby decreasing the load on the physical disk storage device 31B and increasing the load on the physical disk storage device 31D, but not to the extent that had existed on the physical disk storage device 31B.

Figure 3:
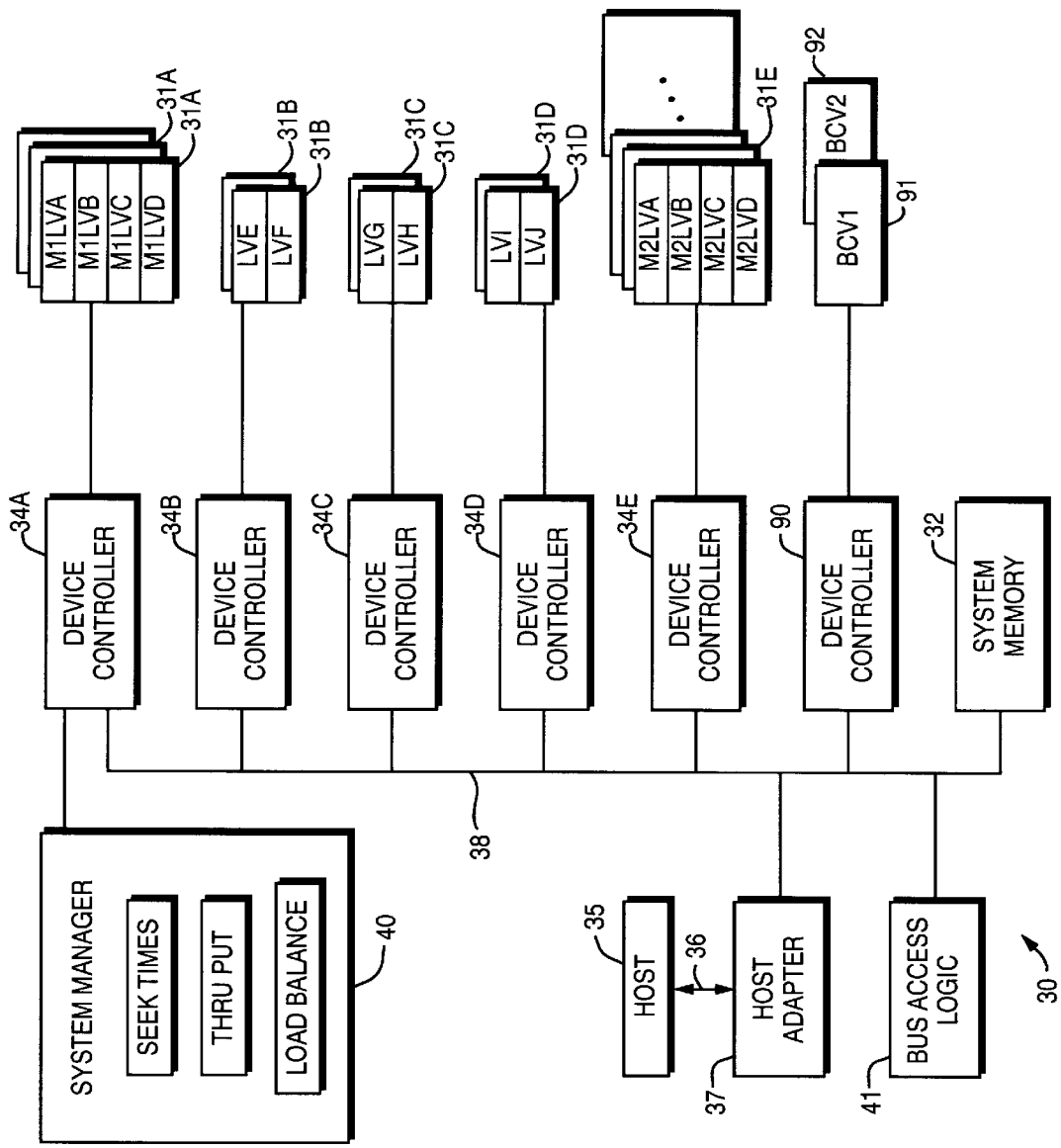
FIG. 3 is a block diagram of another specific data processing system that provides another type of data exchange.

FIG. 3 depicts a modification of the circuit in FIG. 1. in which like reference numerals apply to like items in FIGS. 1 and 3. The modification of FIG. 3 primarily consists of the addition of a device controller 90 with two storage or logical volumes 91 and 92. Although a single device controller 90 and two storage devices 91 and 92 are depicted, storage devices 91 and 92 may connect through different device controllers. A device controller may also control a storage device, such as the storage device 92 and one or more other storage devices. Each of the storage devices 91 and 92 in FIG. 3 are defined as BCV devices described in the foregoing U.S. Pat. No. 6,088,766. BCV devices are adapted to be switched to mirror another device in one operating mode and to be isolated from such a device and accessible for other operations during a second operating mode.

As will now be described such BCV devices can be adapted for performing the exchange procedure 76 depicted in FIG. 2B by acting as buffers during the exchange procedure. For example, assuming that the M1-LVA-LVE exchangable pair are selected, the exchange process could produce a transfer of the data from the M1-LVA and LVE logical volumes to the BCV1 and BCV2 logical volumes 91 and 92, respectively. Thereafter the exchange would be completed by transferring the contents of the BCV2 logical volume 92 to the M1-LVA logical volume and by transferring the contents of the BCV1 logical volume 91 to the LVE logical volume. In essence, viewing the M1-LVA and LVE logical volumes as first and second blocks and the BCV1 and BCV2 logical volumes 91 and 92 as third and fourth blocks, the exchange occurs by transferring the first and second blocks to the third and fourth blocks respectively, and thereafter transferring the third and fourth blocks to the second and first blocks respectively.

Figure 4:
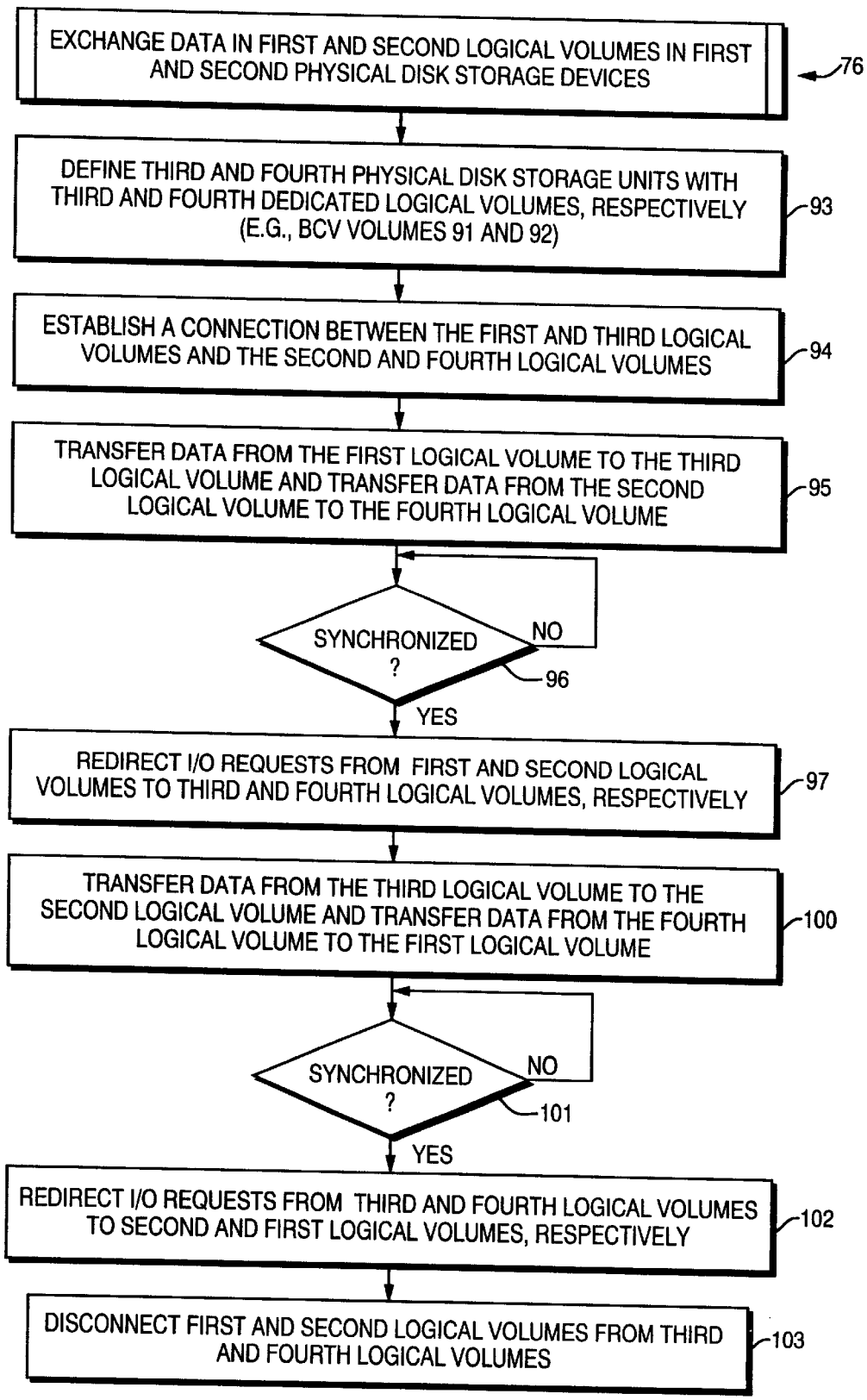
FIG. 4 constitutes a flow diagram that depicts the implementation of the other procedure for exchanging logical volumes in accordance with this invention.

FIG. 4 depicts an alternative procedure by which this exchange can occur. Specifically, the first step 93 defines the third and fourth physical disk storage units with the third and fourth designated logical volumes, respectively. In this particular example, the third and fourth volumes are constituted by the BCV1 and BCV2 logical volumes 91 and 92. In step 94, the "establish" procedure, as defined in the above identified U.S. Pat. No. 6,088,766 effects a connection between the first and third logical volumes (i.e., M1-LVA logical volume and BCV1 logical volume 91) and between the second and fourth logical volumes (i.e., the LVE logical volume and BCV2 logical volume 92).

After establishing this connection in step 94, data transfers from the first logical volume to the third logical volume and from the second logical volume to the fourth logical volume as defined in step 95. When the BCV1 and BCV2 logical volumes 91 and 92, respectively, mirror the data in the M1 LVA logical volume and the LVE logical volume, they are synchronized. When that state exists, the BCV1 and BCV2 logical volumes 91 and 92 contain exact copies of the data on the M1 LVA and LVE logical volumes, respectively. This can occur simultaneously with user processing of the data.

Step 96 monitors the operation and transfers control to step 97 when synchronization has been achieved. Step 97 represents a procedure by which the operating system is notified to redirect all the I/O requests for the M1-LVA logical volume to the BCV1 volume 91 and all I/O requests for the LVE logical volume to the BCV2 volume 92. As known, such redirections are achieved with essentially no interruption or degradation of user programs.

After the redirection to the BCV volumes has been made, the original M1-LVA and LVE logical volumes are inactive. Now a similar procedure to that represented by step 95 begins. That is, the logical volumes formerly occupied by the data in the M1-LVA and LVE logical volumes in the physical disk drives 31A and 31B are attached to the BCV2 and BCV1 volumes 92 and 91, respectively. Now data transfers to these physical disk drives in step 100 using the same BCV mirroring approach used in transferring the data to the volumes 91 and 92. That is, after step 101, the physical disk drives 31A and 31B contain logical volumes as follows:

| LOGICAL VOLUME | PHYSICAL DISK DRIVE | | BCV1 VOLUME | BCV2 VOLUME |
| --- | --- | --- | --- | --- |
| | 31A | 31B | | |
| LVE | X | | | |
| M1-LVB | X | | | |
| M1-LVC | X | | | |
| M1-LVD | X | | | |
| M1-LVA | | X | X | |
| LVF | | X | | X |

When synchronization is achieved after this process has been completed, step 101 shifts control to step 102 that performs a second redirection. During this process, however, the I/O requests for the data in the M1-LVA logical volume are redirected from the BCV1 logical volume 91 to the exchanged M1-LVA logical volume in physical disc drive 31B. Likewise, I/O requests for the LVE logical volume are redirected from the BCV2 logical volume 92 to the exchanged LVE logical volume in the physical disk drive 31A. Thereafter I/O requests continue to be directed to these logical volumes in their exchanged positions.

Thus, the procedure outlined in FIG. 4 provides a means for exchanging data blocks in a very efficient manner by using BCV logical volumes as available buffer memories. Moreover, the exchange can is made independently of any host interaction and be made with little or no impact on the operations of the data processing system.

Figure 5A:
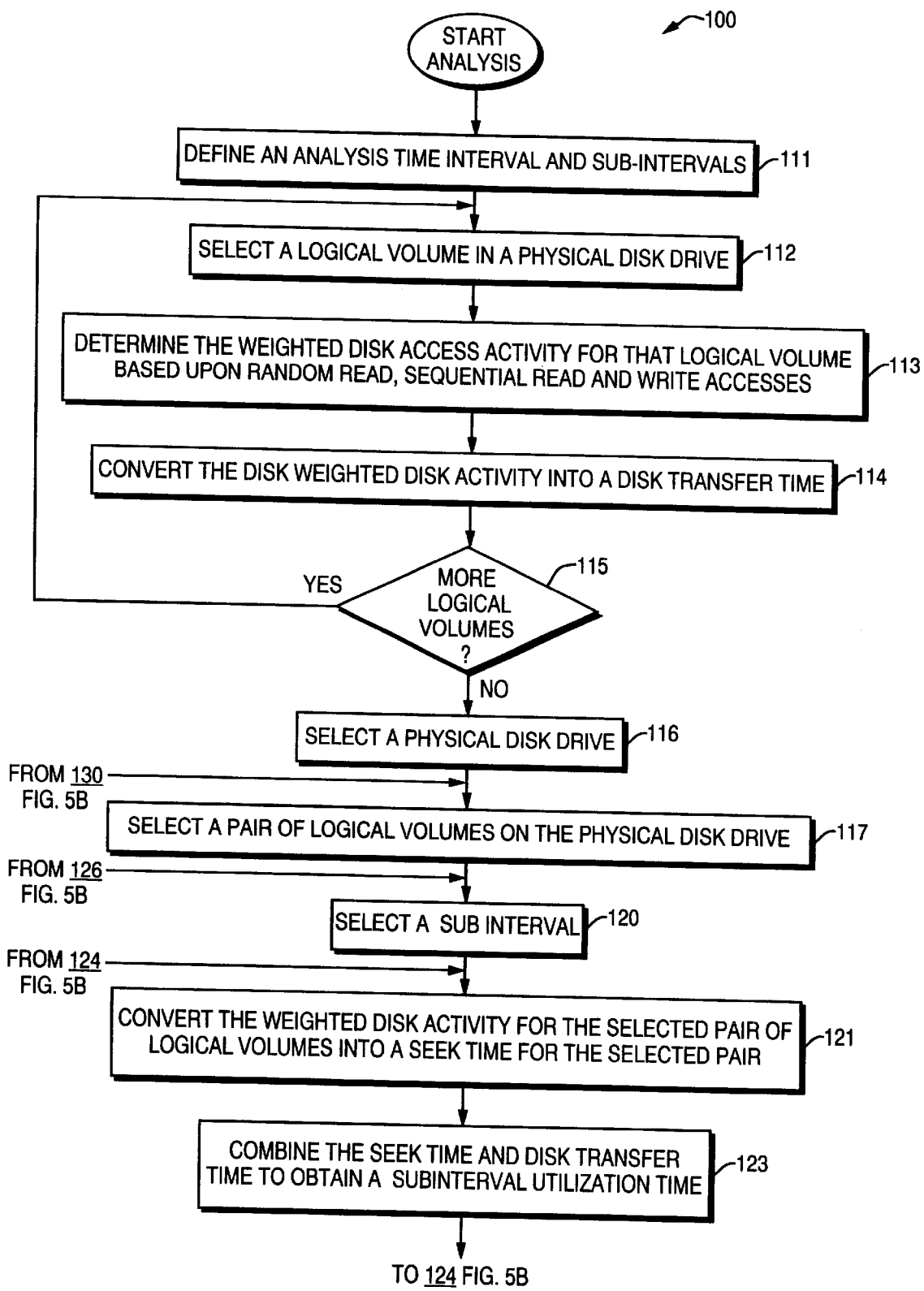
FIGS. 5A and 5B constitutes a flow diagram that depicts an alternative procedure for allocating logical volumnes to be exchanged.
Figure 5B:
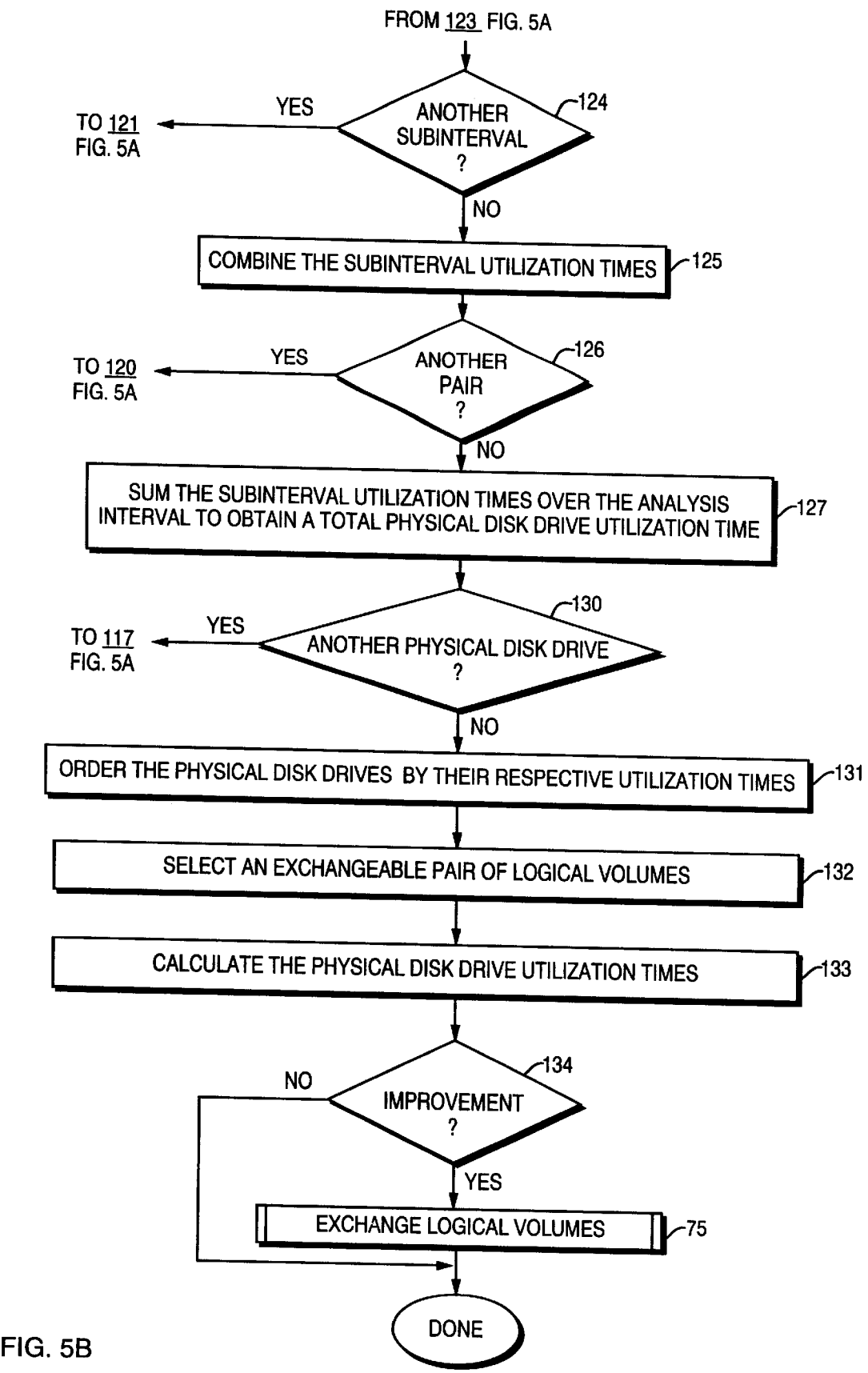

Steps 62 through 77 in FIGS. 2A and 2B depict a procedure for performing analysis based upon disk utilization for each exchangable logical volume as determined by the total number of accesses to a physical disk drive and logical volumes that are the targets of I/O requests. FIGS. 5A and 5B depict a procedure for analyzing load balance using time-based disk utilization statistics as a criterion. This procedure has achieved improved results in many applications.

The analysis time interval for this procedure can be measured in terms of a few hours to days or weeks or longer. Subintervals can also be of arbitrary length ranging from a few minutes to an hour or more. As will become apparent, the duration of a subinterval is a tradeoff between the accuracy of sampling which is desired and the number of calculations that must be performed on the samples. The duration of the analysis time interval depends, in part, upon a time that provides some reasonable level of consistent performance. These can be generally selected with experience. An initial selection of an analysis time interval of one week and subintervals in the order of fifteen minutes has been found to be satisfactory in many applications.

Step 112 represents a conventional procedure by which the system selects a logical volume as a data block for analysis. The system then uses step 113 to count the number of disk accesses and segregate them into independent disk read, disk write and sequencial prefetch read categories. These counting operations are upheld in each logical volume for each of the subintervals in the analysis time interval. It has been found that weighting this information can improve the overall result, particularly a weighting of 1.0 for independent disk reads, 0.5 for disk writes and 0.25 for sequential prefetch reads. Other weightings may also be effective.

The procedure of step 114 converts the weighted disk activity into disk transfer times representing the time to complete the transfer exclusive of any seek operations. That is, the disk transfer time will correspond to any latency time plus the time for transferring selected data. This conversion can be provided by arbitrary or experimental data contained in a table that may represent an average of all systems or specific systems by model and manufacturer. The data may be the manufacturer's design data or may reflect specific measurements at one track on a physical disk drive or at a plurality of spaced tracks.

Once this information has been calculated for a particular logical volume or other data block, step 115 determines whether additional logical volumes exist that remain untested. If more logical volumes exist, control passes back to repeat steps 112 through 114.

After all the logical volumes have been processed to obtain the disk transfer times for each logical volume and each subinterval, step 115 diverts control to step 116. Step 116 begins an analysis that provides seek times for the accesses. Steps 116, 117 and 120 select, in order, a physical drive, a pair of logical volumes on that drive and a subinterval. For each subinterval step 121 represents a procedure by which the number of accesses to the selected pair of logical volumes is converted into a seek time $T(seek)_d$ for a given drive, d, segregated into N logical volumes given by:

$$T(seek)_d = \left[ \frac{\sum_{i \neq j} T_{i,j} * A_i * A_j}{\sum_{k=1}^{N} A_k} \right] \quad (2)$$

wherein $T_{ij}$ represents the seek time and $A_i$ and $A_j$ represent the respective weighted activitities for each of two selected logical volumes for a given pair (i,j) of logical volumes on the disk drive d, wherein $1 \leq i \leq N$, $1 \leq j \leq N$, and i<>j, and wherein $A_k$ represents the total number of accesses for the two logical volumes i,j and $1 \leq k \leq N$ and wherein t represents a subinterval. Equation (2) thus provides a statistical representation of the number of seeks between the logical volumes i and j based upon the activity to each logical volume in that drive over the subinterval. The sum of S for all logical volume pairs on the physical disk drive represents the total number of seek operations conducted by the physical disk drive for the selected subinterval.

There are several ways to determine the seek time $T_{ij}$. In one approach a seek time table records the seek time between each pair of tracks for each type of drive. This seek time can be based upon manufacturer supplied data, sample measurements, in situ measurements or other procedures. Data based upon sample measurements has provided good results.

The monitor 50 will additionally contain in its configuration table a center-line track position of each logical volume on a physical disk drive. Thus, this information will provide, for any seek operation, the starting and ending tracks based upon the centerline track position. It has been found that the use of a centerline track position also provides good results. The starting and ending centerline tracks can then used as an entry into the seek time table information for the corresponding disk drive to obtain the $T_{ij}$ time for that specific disk drive. Thus, for a given pair of logical volumes, the seek time $T(seek)_d$ derived from Equation (2) provides a good statistical approximation the total seek time involved for the specified pair of logical volumes during the subinterval. Step 123 then combines the seek time and the disk transfer times to obtain a subinterval utilization time that represents the total time that a physical disk operates in performing transfers including all of the seek, latency and transfer times associated with that activity.

Step 124 in FIG. 5B determines whether all the subintervals have been processed. If more subintervals exist for the selected pair of logical volumes, step 124 branches back to step 121 to repeat the process of steps 121 and 123. When the subinterval utilization times have been obtained for all the subintervals, step 125 combines or sums the times to obtain a subinterval utilization time for that selected pair of logical volumes. Step 126 then determines whether additional pairs of logical volumes exist on the physical disk drive selected in step 116. If another pair of logical volumes exists, control passes back to step 117 to obtain the combined subinterval utilization times for that pair.

After all the utilization times for different logical volume pairs on the physical disk drive have been obtained and summed step 126 transfers control to step 127, thereby to sum the interval utilization times over the entire interval to obtain total physical disk drive time-based utilization statistics for that particular physical disk drive. Step 130 then determines whether additional physical drives need to be tested and branches back to step 117 to select another physical drive if needed.

After all the physical drives have been analyzed, control passes from step 130 to step 131 in which the physical disk drives are ordered by their respective time-based utilization statistics. In step 132 an exchangable pair of logical volumns is selected. This selection process can be acheived in many ways. A simple approach is merely to define an exchangable pair in which one of the pair is the busiest logical volume in the physical disk drive with the highest time-based utilization statistics and the second is the least busy logical volume on the physical disk drive having the lowest time-based utilization statistics. The philosophy is that if the busiest logical volume on the busiest physical drive is exchanged for the least busy volume on the least busy drive improved load balancing will be achieved.

Step 133 represents the procedure by which the previous process of steps 112 through 131 are repeated using the information from the proposed exchange disk drives. That is, in the particular example described above, the analysis would be revised by examining physical disk drives 31a and 31b to recalculate their various parameters assuming the LVE logical volume is exchanged with the M1-LVA logical volume. If an improvement seems likely, step 134 branches to step 75 representing either of the foregoing processes for exchanging logical volumes. If not, the analysis ends without making any exchange.

The foregoing analysis is described with a single selected exhangable pair being analyzed. It will be also apparent that it may be advantageous to examine the changes in relative physical disk loading balance looking at the various combinations that could exist among all the exchangable logical volumes pair taken one pair at a time. Typically, however, this will require such significant processing time as to become impractical. As still another alternative, a preset number of exchangable pairs could be evaluated in order to limit the amount of time required to make a determination of whether an exchange would be beneficial.

In summary, this foregoing disclosure defines a method and apparatus for balancing the load in a magnetic disk storage system comprising a plurality of physical disk drives. Typically each disk drive is divided into multiple logical volumes. Statistics of the occurrence of read, write, and sequential prefetch read operations are maintained over at least an analysis interval as a function of time. The analysis interval comprises a series of sampling subintervals and uses a statistical analysis to process the data for each subinterval, for each pair of logical volumes within a single physical disk drive and for all total activity in terms of a physical disk drive utilization time representing the total time subinterval that the physical disk drive is involved in various read and write operations during the analysis interval. Two specific processes have been proposed. Procedures are disclosed for analyzing a data to obtain a disk utilization time number. Thereafter the disk utilization time information can be used in the selection of two candidates for a logical volume exchange. When a pair has been selected, one of two procedures as described above, enable the exchange to occur with minimal interruption to normal data processing operations.

The foregoing description discusses this invention in terms of data organized into blocks of contiguous storage locations on a physical disk of known size called logical volumes. However, the invention is applicable to other data organizations. In some applications, for example, a logical volume might be divided into a series of sub-volumes distributed across plural physical disk storage devices. Such a division could be made for redundancy and recovery purposes or for load distribution purposes. Each block, whether a logical volume, sub-volume or other grouping, constitutes a block of contiguous storage locations of a predetermined size. Conversely and consequently, a block then can be a single logical volume, sub-volume or other grouping.

The invention as previously described, is equally applicable to such systems. That is, the method operates with any blocks of contiguous storage locations, be they organized as logical volumes, sub-volumes or other groupings. In essence and in accordance with any of the foregoing embodiments of this invention, various read and write statistics are accumulated for each block over a time interval. A list of all pairs of exchangeable blocks are established using the previously described size and other criteria that correspond to the criteria discussed in connection with step 63 in FIG. 2A. If a logical volume is divided into sub-volumes for redundancy, an additional criteria could prevent sub-volumes from the same logical volume from residing on one physical disk storage device. The configuration to be established is then evaluated in the same manner as the configuration is evaluated for an array divided into logical volumes, except for the evaluation being based on individual blocks. Assuming the configuration will provide better performance, the exchange is made in a manner that is analogous to the exchange in step 76 of FIG. 2B in accordance with the exchange procedure of FIG. 4.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for balancing activity on a plurality of physical disk storage devices in a data processing system wherein at least two of the physical disk storage devices are divided into a plurality of blocks of contiguous locations for storing data, the method comprising the steps of:
   A) compiling disk access statistics for each block over a time interval,
   B) selecting first and second blocks on different ones of the physical disk storage devices to be exchanged based upon the compiled disk access statistics, and
   C) exchanging the data in the selected first and second blocks independently of the operation of the data processing system.

2. A method as recited in claim 1 wherein the data processing system includes another physical disk storage device with a third block of contiguous storage locations capable of storing the either of said first and second blocks and wherein said step of exchanging includes transferring the data in one of the first and second blocks through the third block.

3. A method as recited in claim 2 wherein said step of exchanging data includes the steps, in sequence, of:
   i) transferring the data in the first block to the third block,
   ii) transferring the data in the second block to the first block, and
   iii) transferring the data in the third block to the second block.

4. A method as recited in claim 3 wherein selecting of the first and second blocks includes the step of determining a statistical variance for each possible pair of exchangeable logical volumes and selecting that pair for which a minimal statistical variance exists.

5. A method as recited in claim 2 wherein the data processing system includes another physical disk storage device with a fourth block of contiguous storage locations capable of storing either of said first and second blocks and wherein said step of exchanging includes transferring the data in the first and second blocks through the third and fourth blocks.

6. A method as recited in claim 5 wherein the step of exchanging data includes the steps of:
   i) transferring the data in the first and second blocks to the third block and fourth blocks, respectively, and
   ii) thereafter transferring the data in the third and fourth blocks to the second and first blocks, respectively.

7. A method as recited in claim 5 wherein the step of exchanging data includes the steps of:
   i) simultaneously transferring the data in the first and second blocks to the third block and fourth blocks, respectively, and
   ii) thereafter simultaneously transferring the data in the third and fourth blocks to the second and first blocks, respectively.

8. A method as recited in claim 7 wherein the simultaneous data transferring steps includes the steps of:
   i) monitoring the simultaneous transfers to the third and fourth blocks for synchronization between the first and third blocks and the second and fourth blocks, and
   ii) initiating said simultaneous transfer of data from the third and fourth blocks to the second and first blocks after said monitoring step indicates synchronization occurs.

9. A method for balancing activity on a plurality of physical disk storage devices in a data processing system wherein at least two of the physical disk storage devices are divided into a plurality of logical volumes for storing data and wherein the data processing system additionally includes first and second buffer volumes on other physical disk storage devices capable of storing the data on first and second logical volumes, respectively, said method comprising the steps of:
   A) compiling disk access statistics for all the logical volumes over a time interval,
   B) selecting the first and second logical volumes on different physical disk storage devices to be exchanged based upon the compiled disk access statistics, and
   C) automatically initiating an exchange of the data in the selected first and second logical volumes by transfer through the first and second buffer volumes independently of the operation of the data processing system.

10. A method as recited in claim 9 wherein the step of exchanging data includes the steps of:
    i) transferring the data in the first and second logical volumes to the first and second buffer volumes, respectively, and
    ii) thereafter transferring the data in the first and second buffer volumes to the second and first logical volumes, respectively.

11. A method as recited in claim 9 wherein the step of exchanging data includes the steps of:
    i) simultaneously transferring the data in the first and second logical volumes to the first and second buffer volumes, respectively, and
    ii) thereafter simultaneously transferring the data from the first and second buffer volumes to the second and first logical volumes, respectively.

12. A method as recited in claim 11 wherein the simultaneously data transferring steps includes the steps of:
   i) monitoring the simultaneous transfers to the first and second buffer volumes for the establishment of synchronization with the first and second logical volumes, and
   ii) initiating said simultaneous transfer of data from the first and second buffer volumes to the second and first logical volumes after said monitoring step indicates synchronization occurs.

13. A method for balancing activity on a plurality of physical disk storage devices in a disk array storage device operating in a data processing system wherein at least one host interacts with the disk array storage device, wherein the disk array storage device includes at least two disk adapters for controlling transfers with at least two of the physical disk storage devices that are divided into a plurality of logical volumes for storing applications, and wherein the data processing system additionally includes first and second continuation volumes on other physical disk storage devices that are capable of storing one of first and second logical volumes and are inaccessible from applications, said method comprising the steps of:
   A) compiling disk access statistics for all the logical volumes in the disk array storage device over a time interval,
   B) selecting the first and second logical volumes on physical disk storage devices connected to different disk adapters to be exchanged based upon the compiled disk access statistics, and
   C) initiating an exchange of the data in the selected first and second logical volumes by transfer through the first and second continuation volumes independently of any host interaction thereby to minimize any adverse impact on the operation of the data processing system.

14. A method as recited in claim 13 wherein the step of exchanging data includes the steps of:
   i) connecting the first and second continuation volumes to the first and second logical volumes thereby to initiate a transfer of data to the first and second continuation volumes, respectively, and
   ii) thereafter connecting the first and second continuation volumes to the second and first logical volumes, respectively, thereby to transfer data whereby the data in the first and second logical volumes is exchanged.

15. A method as recited in claim 13 wherein the step of exchanging data includes the steps of:
   i) connecting the first and second continuation volumes to the first and second continuation volumes, respectively, thereby to transfer data to the first and second continuation volumes, and
   ii) thereafter connecting the first and second continuation volumes to the second and first logical volumes, respectively, thereby to transfer data to the second and first continuation volumes.

16. A method as recited in claim 15 wherein said simultaneous data transferring steps includes the steps of:
   i) monitoring the simultaneous transfers to the first and second continuation volumes for the establishment of synchronization with the first and second logical volumes, and
   ii) responding to synchronization by initiating the transfer of data from the first and second buffer volumes to the second and first logical volumes.

* * * * *